United States Patent [19]

Seiger et al.

[11] 4,120,757
[45] Oct. 17, 1978

[54] METHOD OF MAKING SINTERED PLAQUE CADMIUM ELECTRODES

[75] Inventors: Harvey N. Seiger; Vincent J. Puglisi, both of Waterford, Conn.

[73] Assignee: Yardney Electric Corporation, Pawcatuck, Conn.

[21] Appl. No.: 854,928

[22] Filed: Nov. 25, 1977

[51] Int. Cl.$^2$ .......................... C25D 9/08; C25B 1/16; C25B 11/06

[52] U.S. Cl. .................................. 204/2.1; 204/56 R; 204/96

[58] Field of Search ................... 204/2.1, 24, 56 R, 96

[56] References Cited

U.S. PATENT DOCUMENTS

| | | | |
|---|---|---|---|
| 3,203,879 | 8/1965 | Mueller | 204/24 |
| 3,214,355 | 10/1965 | Kandler | 204/56 R |
| 3,455,741 | 7/1969 | Schneider | 204/2.1 |
| 3,573,101 | 3/1971 | Beauchamp | 204/2.1 |
| 3,779,810 | 12/1973 | Kanetsuki | 204/96 |
| 3,873,368 | 3/1975 | Pickett | 204/2.1 |

Primary Examiner—T. M. Tufariello
Attorney, Agent, or Firm—Donald E. Nist

[57] ABSTRACT

The improved method of the invention comprises electrochemically depositing cadmium hydroxide into the pores of a sintered nickel plaque cathode from a heated electrolyte at acid pH and at controlled density in a treating zone containing an anode, at least periodically contacting the electrolyte during the electro chemical deposition with neutralizing agent selected from cadmium oxide and cadmium hydroxide to neutralize acid generated at the anode, and continuing the electrochemical deposition until an improved loading level of cadmium hydroxide within the cathode is obtained. The acid pH preferably is between 2 – 5 and the electrolyte preferably is in a concentration of 2 – 3 M and at an average temperature of about 85° – 105° C. Preferably, the current density is maintained at a level of less than one ampere per square inch in order to improve the loading level, which may be as high as about 2.6 grams of cadmium hydroxide per cubic centimeter of void volume in the cathode. The neutralizing agent may be disposed in a porous container in a separate reservoir zone connected to the treating zone so that the electrolyte can circulate therebetween and into direct contact with the neutralizing agent. The method results in a loading level of cadmium hydroxide in the sintered nickel plaque cathode as high as or higher than previously obtained and in a shorter period of time. The method is simple, inexpensive and efficient.

10 Claims, No Drawings

METHOD OF MAKING SINTERED PLAQUE CADMIUM ELECTRODES

BACKGROUND OF THE INVENTION

1. Field of the Invention

The present invention generally relates to electrodes and more particularly relates to an improved method of making a cadmium electrode

2. Prior Art

Electrodes utilized in long-lived alkaline nickel-cadmium batteries desirably exhibit high densities and high percentage of active material. The cadmium electrode which is used as the negative electrode in such batteries is formed by impregnating a porous sintered nickel body known as a plaque with active cadmium material, that is hydroxide, or sometimes the oxide. The most widely used deposition method consists of filling the pores of the plaque with a solution of cadmium-bearing salts or with a molten cadmium salt, usually with the aid of a vacuum. The cadmium-bearing salt, once deposited in the pores or cavities of the plaque, is then converted to cadmium hydroxide by treatment with an alkaline solution. This is often accompanied by cathodic polarization to enhance the migration of the alkali into the plaque. This impregnation procedure has to be repeated several times in order to increase the concentration of cadmium hydroxide to an acceptable level.

Molten cadmium nitrate is often used ($Cd(NO_3)_2 \cdot 4H_2O$) because it is the most highly concentrated source of cadmium ions, with a density of 2.03 grams per cubic centimeter just above its melting point and with a cadmium ion content of 36.4%. This results in a loading level of the cadmium hydroxide of 1.65 grams per cubic centimeter of void volume in the porous plaque. A second impregnation cycle with the molten cadmium nitrate theoretically would increase the loading level to 2.73 grams per centimeter of void volume. However, penetration of the molten salt is less than complete becuase of the high viscosity of the liquid, the vapor pressure of the liquid and the capillary size of some of the voids. Void penetration is usually only about 65% effective. In order to reach loading levels in excess of about 2.4 grams per cubic centimeter of void volume, this procedure requires from about 3 to 9 impregnation cycles, and thus is quite expensive and time consuming.

More recently, electrochemical impregnation methods have been developed to achieve suitably high impregnation levels in a single step. Cadmium-bearing salt solutions are used, generally of about 2-3 M concentration at about 85°-105° C. Cadmium nitrate is usually used at about 2-5 pH, the acidity being maintained by periodic addition of nitric acid. An older process along the same lines utilizes more dilute solutions and room temperature, as specified in U.S. Pat. No. 3,214,355, but the loading levels achieved are too low to be significant. U.S. Pat. No. 3,573,101 follows the teachings of U.S. Pat. No. 3,507,699 but applies both elevated temperature and potassium nitrite, the latter to stabilize the pH. A slightly different procedure is set forth in U.S. Pat. No. 3,873,368 but in all these cases of electrochemical impregnation, the loading level of cadmium hydroxide in the plaque remains significantly below 2.4 grams and usually is not above 1.8 grams per cubic centimeter of void volume in the plaque.

Therefore, it would be desirable to provide a simple, inexpensive, highly efficient method of impregnation of cadmium hydroxide in porous sintered nickel plaque, preferably by a single step method which would result in a loading level well above 2 grams per cubic centimeter of void volume without having to repeat the process.

SUMMARY OF THE INVENTION

The foregoing needs have been satisfied by the improved method of the present invention for the manufacture of sintered plaque cadmium electrodes useful in long lived nickel-cadmium batteries and the like. The method is simple, rapid, inexpensive and efficient.

It results in a loading level of cadmium hydroxide in the plaque well above two grams per cubic centimeter of void volume in the plaque. The method is substantially as set forth in the Abstract above. Thus, it involves electrochemically depositing cadmium hydroxide into the pores of a porous sintered nickel plaque cathode in the presence of a selected anode and in a heated electrolyte at controlled pH and current density while at least periodically contacting the electrolyte with either cadmium oxide or cadmium hydroxide or a mixture thereof to neutralize the acid which is generated at the anode during the deposition and replace the deposited cadmium. Preferably, the current density during the deposition is maintained at less than about 1 ampere per square inch in order to further increase the loading level in this single step method to about 2.6 grams of cadmium hydroxide per cubic centimeter of void volume in the plaque.

Preferably, the neutralizing agent is disposed in an electrolyte reservoir zone connected to the treating zone and electrolyte is circulated between the two zones into direct contact with the neutralizing agent. That agent is preferably contacted within a porous container such as a bag or the like.

Further features and aspects of the present method are set forth in the following detailed description.

DETAILED DESCRIPTION

The improved method of the present invention for making sintered plaque cadmium electrodes involves electrochemically depositing cadmium hydroxide into the pores of a sintered nickel plaque cathode from a heated electrolyte at acid pH and controlled current density. The electrolyte preferably comprises cadmium nitrate in a concentration of about 2-3 M. However, other concentrations in aqueous solution can be used, for example:

1.5 or 3.5 M $Cd(NO_3)_2$

The electrolyte is at an acid pH at preferably about 2-5, and at an elevated temperature at preferably 85°-105° C. The anode may be any inert anode which performs adequately for the method. Platinum coated titanium anodes have been successfully used and are of reasonable price. Other suitable anodes include the following: platinum, palladium, or other noble metals resistant to oxidation under the bath conditions. Cadmium metal anodes may also be used in which case the chemistry is such that the bath becomes more basic. The acidity of the system is maintained by the periodic addition of nitric acid.

Regarding the process of electrochemical deposition, it is believed that as current has passed through the cathode, such current is responsible for the reduction of the nitrate ion to ammonia with concurrent production of hydroxide ions. The ammonia remains dissolved in the aqueous solution within the cavities until conditions change. The production of hydroxide raises the pH and as it increases to a value of 6.8 cadmium hydroxide begins to precipitate in the plaque cavities. Cadmium ions are precipitated quantitatively when the pH increases to 8.4 and when the pH reaches a value of 13.5 the partial pressure of the ammonia generated is great enough to expel the exhausted solution from the cavities. The gaseous ammonia then reaches the electrolyte of the bath and dissolves in it to create a vacuum within the cavity which forces fresh electrolyte thereinto so that the precipitation of cadmium hydroxide in the cavity begins again. This replenishment action may occur more than 8 times to supply the desired 2.4 grams or more of cadmium hydroxide per cubic centimeter of void volume. It has also been determined that the maximum loading level of cadmium hydroxide in the cavities of the plaque is inversely proportional to a coefficient which is related to current, so that decreasing the density increases the maximum loading level within the plaque. Obviously, the current density should not be lowered to a point such that the time necessary to produce the desired electrode is unreasonably long. However, relatively low current densities can produce high loading levels within a reasonable amount of time. Table I below sets forth the results of production runs involving various current densities:

TABLE I

| Current Density, Amps per square inch | Loading Level, Grams Cadmium Hydroxide per cubic centimeter void volume |
|---|---|
| 2.0 | 1.8 |
| 1.4 | 2.1 |
| 0.55 | 2.6 |

Thus Table I clearly demonstrates that as the current density decreases, the maximum loading level within the plaque increases. Accordingly, one feature of the present invention is to control the current density applied during the electrochemical deposition so as to increase the loading level of cadmium hydroxide to at least about 2 grams per cubic centimeter of void volume and preferably as high as 2.6 grams or more per cubic centimeter.

An important feature of the present method is to at least periodically contact the electrolyte during the electrochemical deposition with neutralizing agent selected from the group consisting of cadmium oxide, cadmium hydroxide or mixtures thereof in order to neutralize acid which is generated at the anode during the electrochemical deposition. At the anode water is consumed and oxygen (which escapes from the aqueous solution) is produced along with hydrogen ions, with a consequent decrease in the pH. If the pH is allowed to decrease sufficiently, it will ultimately adversely affect the reaction at the cathode by neutralizing the hydoxide ions produced at the cathode, thereby preventing the deposition of insoluble cadmium within the cavities of the plaque. In one prior art process, potassium nitrite is added so that the anode oxidizes it to nitrate in order to control and stabilize the pH. However, this additive builds in concentration to a point where the treating zone becomes unusable and must be replaced.

In another prior art process the anode is made an active anode form of electrochemical cadmium. However, after only a short time of use, gases evolve at the anode while a precipitate covers the anode. The precipitate has been found to be basic cadmium nitrate which is poorly conductive and causes the process in the anode to revert to the undesired previously described reaction which provides a decrease in the pH. The poorly conductive film requires a high voltage and causes overheating of the treating zone. Therefore, the anode must be changed frequently.

The only drawback in using an inert anode in the general method is proton production, which decreases the pH to the point where electrochemical impregnation stops. In accordance with the present method, however, this effect is neutralized through the use of a neutralization agent selected from cadmium oxide, cadmium hydroxide or mixtures thereof. This agent is a base which neutralizes the acid formed and has the additional effect of decreasing the rate at which cadmium ion is depleted from the treating zone by deposition in the plaque. Both cadmium oxide and cadmium hydroxide are insoluble in water but dissolve in acid by neutralization so that the neutralization agent becomes soluble exactly proportional to the proton production in the hot electrolyte.

In accordance with the present method, it is preferred to place the neutralization agent in a porous container, for example, made of cloth or a metallic perforated basket and to dispose this agent in a reservoir connected to the treating zone so that electrolyte can pass between these two zones. Preferably, the neutralization agent in the container is positioned in the direct path of flow of the electrolyte from the treating zone, for example, immediately below a weir separating the two zones.

The overall reaction which occurs in this method is the sum of individual reactions taking place at the cathode, the anode and in the electrolyte in the treating zone and reservoir. At the cathode, ammonia and hydroxide ions are being formed from cadmium nitrate and water and the hydroxide causes the precipitation of cadmium in the form of insoluble cadmium hydroxide in the cavities of the plaque. At the anode water is converted to oxygen and hydrogen ions. In the reservoir the cadmium oxide or hydroxide neutralizes the hydrogen ions (or protons) as they are formed, with the resultant production of water and cadmium ions. The overall total reaction may be represented by the following:

$$2HNO_3 + 12H_2O + Cd(NO_3)_2 + 8CdO \rightarrow 2NH_4NO_3 + 9Cd(OH)_2 + 4O_2$$

From the above reaction it will be noted that the cadmium hydroxide deposited in the cavities is mostly obtained from the cadmium oxide or hydroxide utilized as the neutralization agent, only 1/9th of the total cadmium coming from the cadmium nitrate in the electrolyte, so that replenishment of the cadmium nitrate need only be done infrequently. The oxygen escapes from the treating zone, while the ammonium nitrate builds up in the electrolyte, hydrolyzes acid and, in conjuction with the nitric acid, acts as a pH buffer. When the buffer capacity is exceeded, which is infrequently, it is renewed by replenishment by nitric acid. The overall volume in the treating zone and reservoir is maintained with water which is replaced with the water of crystallization in the cadmium nitrate and the water in the nitric acid. When the ammonium nitrate builds up to a point where it exceeds its solubility and precipitates, it can easily be removed from the system by filtration.

The present method has a number of advantages. Thus, the electrolyte need be attended to less frequently. Overall production costs utilizing the method are reduced as are labor costs. The production of the desired cathodes is improved in that more highly impregnated plaques or plates are obtained so that the total weight of the negative electrodes necessary to form the nickel cadmium battery is reduced, with a consequent saving.

The following specific examples illustrate certain features of the present invention:

EXAMPLE I

An electrochemical deposition bath is provided which contains a 2 M concentration of aqueous cadmium nitrate solution adjusted to an initial pH of 3 with nitric acid. A sintered nickel plaque having the dimensions 16.8in$^2$ × 0.032 inch is disposed in the bath as a cathode and is electrically interconnected with an anode in the bath which anode comprises platinum plated porous titanium of the dimensions 5.0 inches × 4.12 inches × 0.05 inch. The bath is disposed within a tank and is connected to a reservoir chamber within the tank through a weir. An immersion heater is disposed in the reservoir to heat the electrolyte to a temperature of about 93° C. and a bag comprising a porous cloth is filled with cadmium oxide and disposed in the reservoir immediately below the weir. A pump facilitates movement of the electrolyte from the bath into the reservoir and back to the bath. A current density of 0.55 amps per square inch is imposed on the electrodes in order to initiate the electrochemical deposition of cadmium hydroxide within the pores of the nickel plaque cathode in the bath. This electrochemical deposition is continued for a period of 0.6 hours, whereupon the current is shut off and the cathode removed from the bath, anodized in a potassium hydroxide or sodium hydroxide solution (about 5M) for approximately 60 minutes at 25° C., then rinsed with water, dried and further treated in accordance with the following procedure to form a finished cathode for use in a nickel cadmium battery: 80° C. for two hours in an atmosphere devoid of $CO_2$.

The plate thus formed is found to have a loading level of cadmium hydroxide of about 2.6 grams per cubic centimeter of void volume and to be high quality.

EXAMPLE II

The procedure of Example I is carried out except that electrolyte comprises $Cd(NO_3)_2$ at a M concentration of 2 M. Cadmium hydroxide is used as the neutralizing agent while disposed in a metal screen basket of 316 stainless steel in the reservoir; the anode is platinum plated titanium; the electrolyte initial pH is 3.0 and temperature is 93° C. The current density applied is 2.0 A/in$^2$ and the loading level obtained within 0.2 hours is 1.8 g/cc void. The finished plaque is then removed from the treating zone and anodized and then further treated by the procedure set forth in Example I to provide a finished product.

From Examples I and II as well as other tests, it has been found that the higher the current density the larger the deposit of surface material on the plaque, which surface material must be removed. Consequently, the ease with which the plaque is processed after the electrochemical deposition depends upon the current density used during the electrochemical deposition, the lower the density the less effort needed to convert the plaque to a finished product. This represents another advantage achieved by the present method over conventional methods.

It will be understood that various modifications, changes, alterations and additions can be made in the present method, its steps and parameters. All such modifications, changes, alterations and additions as are within the scope of the appended claims form part of the present invention.

What is claimed is:

1. An improved method of making sintered plaque cadmium electrodes, said method comprising:
    a. electrochemically depositing cadmium hydroxide into the pores of a sintered nickel plaque cathode from a heated aqueous electrolyte at acid pH and at a controlled current density in a treating zone containing an anode;
    b. at least periodically contacting said electrolyte during said electrochemical deposition with neutralizing agent selected from the group consisting of cadmium oxide, cadmium hydroxide and mixtures thereof to neutralize acid generated at said anode in said treating zone; and,
    c. continuing said electrochemical deposition until an improved loading level of said cadmium hydroxide within said sintered nickel plaque cathode is obtained.

2. The improved method of claim 1 wherein said electrolyte comprises aqueous cadmium nitrate, wherein at least the surface of said anode contains noble metal and wherein said acid pH is about 2-5.

3. The improved method of claim 2 wherein said electrolyte is present in a concentration of about 2-3M and at a temperature of about 85° – 105° C. and wherein said current density is constant.

4. The improved method of claim 1 wherein said neutralizing agent is disposed in a separate reservoir zone and wherein said electrolyte circulates between said treated zone and said reservoir zone for contact with said neutralizing agent.

5. The improved method of claim 4 wherein said electrolyte is heated to a desired temperature in said reservoir zone.

6. The improved method of claim 5 wherein said electrolyte passes into said reservoir zone into direct contact with said neutralizing agent.

7. The improved method of claim 5 wherein said neutralizing agent is disposed in said reservoir zone in a porous container.

8. The improved method of claim 1 wherein current density in said treating zone is kept sufficiently low so as to further increase the loading level of cadmium hydroxide in said sintered nickel plaque electrode.

9. The improved method of claim 8 wherein said current density is maintained at a level of less than about 1 ampere per square inch.

10. The improved method of claim 9 wherein said anode comprises platinum-plated titanium and wherein said method is continued until said loading level is about 2.6 grams of said cadmium hydroxide per cubic centimeter of void volume in said sintered nickel plaque cathode.

* * * * *